(No Model.)
I. H. FARNHAM.
TEST CIRCUIT AND APPARATUS FOR ELECTRICAL CABLES.
No. 379,532. Patented Mar. 13, 1888.
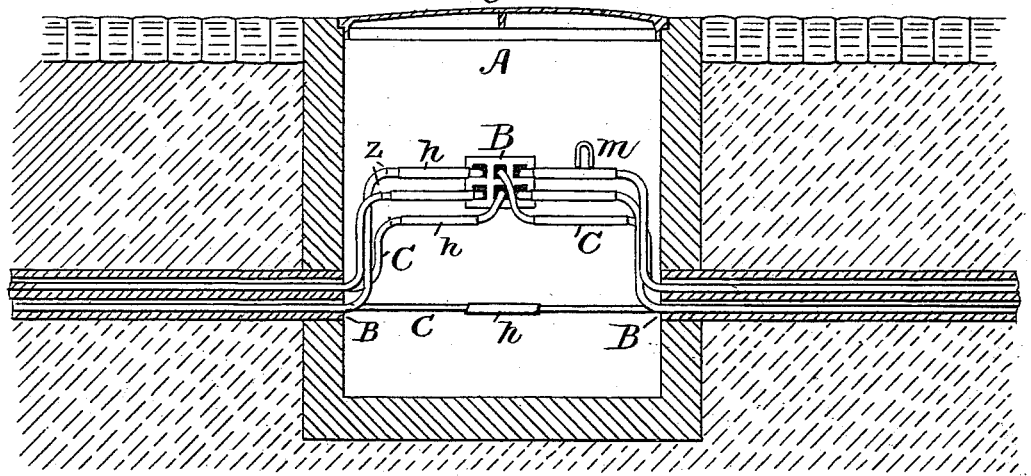
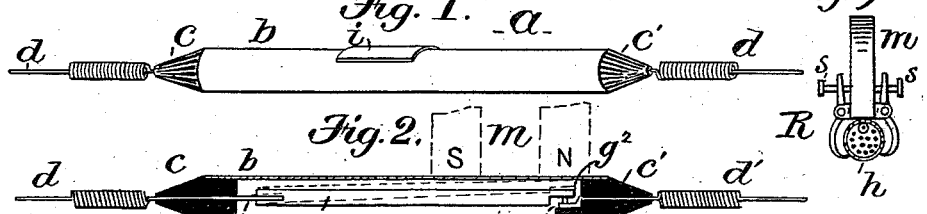
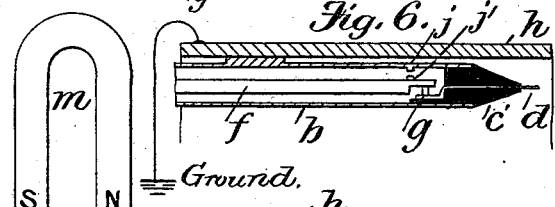
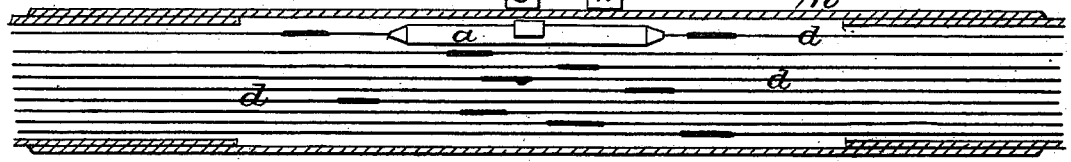
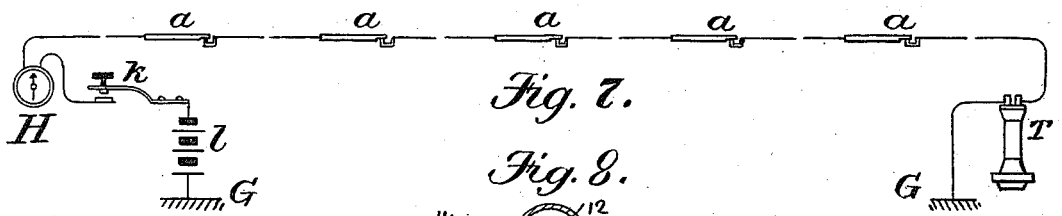
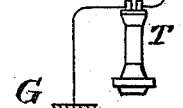
Witnesses.
Geo. Willis Pierce.
Fred. J. F. Schwartz.
Inventor.
Isaiah Henry Farnham.

UNITED STATES PATENT OFFICE.

ISAIAH HENRY FARNHAM, OF MALDEN, ASSIGNOR TO THE NEW ENGLAND TELEPHONE AND TELEGRAPH COMPANY, OF BOSTON, MASSACHUSETTS.

TEST-CIRCUIT AND APPARATUS FOR ELECTRICAL CABLES.

SPECIFICATION forming part of Letters Patent No. 379,532, dated March 13, 1888.

Application filed November 26, 1887. Serial No. 256,199. (No model.)

*To all whom it may concern:*

Be it known that I, ISAIAH HENRY FARNHAM, of Malden, in the county of Middlesex and State of Massachusetts, have invented certain Improvements in Test-Circuits and Apparatus for Electrical Cables, of which the following is a specification.

My present invention relates to appliances for testing the insulation or conductivity of multiple-conductor electric cables.

Heretofore and prior to my invention two distinct plans have been employed. The first of these is to provide in the cable a number of dead-wires each normally open or disconnected at the interior end, and each of a different length, and consequently terminating at a different point within the cable. A permanent record must be kept of the insulation resistance of these wires, and by comparison with this record the condition of the insulation can be determined by periodical remeasurements. The second plan involves the attachment at the several testing-vaults of a box attached to the cable and inclosing electro-magnetic circuit-breakers. The electro-magnet within each box is included in one of the cable-conductors, and by energizing this electro-magnet from the end of the said conductor by the application of a battery its armature is attracted, the circuit of another of the cable-conductors is led through the back-stop and armature-lever of the electro-magnet, and thus by the attraction of the said armature the circuit of the second conductor controlled thereby can be broken. In this plan several electro-magnets can be placed at suitable intervals and included in the same circuit; or they may, if desired, be connected each with a separate circuit, and different wires are led through the successive circuit-breakers controlled by the electro-magnets.

The foregoing methods and the appliances to carry them out are described in patents issued to W. R. Patterson, bearing numbers 293,775 and 369,122, and dated, respectively, February 19, 1884, and August 30, 1887, and these patents, so far as I am aware, represent the state of the art. I have, however, found in practice that both plans have certain imperfections, which my invention aims to eliminate. If, for example, the first plan be adopted in a cable of five thousand five hundred feet in length, with a working vault at every five hundred feet, to locate a fault in this cable between any two vaults ten dead-wires must enter the cable, and these are utterly useless, except occasionally and at widely-remote periods, for testing purposes, yet they occupy considerable space, and if put in upon the most economical plan, (from each end,) fifteen thousand feet, or nearly three miles, of insulated wire is lost to ordinary use and practically wasted. Moreover, it is difficult and expensive to manufacture the cables in this way, for each section of cable requires to be made for its particular location, with its proper number of test-wires. Great care also has to be taken in splicing the test-wires, and a careful record of the length of the wires must be preserved, or they will prove worse than nothing in testing; or, if the second plan be employed, the cable must have a box or other undesirable enlargement attached to it at each manhole. If all the test-magnets are placed on one circuit, then all the armatures must be on separate circuits. In a mile of cable ten working-circuits must pass through the relay-connections, and thus, when testing is going on, all of these working-wires would have to be opened at once, thus interrupting business to a serious extent. The circuit operating the electro-magnets cannot efficiently be used for telephonic purposes on account of the increased amount of electro-magnetic retardation due to the presence of the magnets. This plan also involves an extended and accurate record for the purpose of determining at which vault each wire is broken by the electro-magnet. It is also expensive to properly attach all these boxes and slow and difficult work to properly connect the test-wires.

The object of my invention is to overcome all of these practical defects of operation, and to provide a simple, economical, yet perfectly efficient, plan of testing, with equally simple appliances for operating the same.

Broadly stated, my plan involves no extra wires at all. I require but a single wire, which may be one of the wires ordinarily used for the regular work of the system. At any number of points at suitable distances apart I introduce into the circuit of this wire normally-closed circuit-breakers, the movable part of which is of magnetic metal. These are inclosed in tubes or cases or shells of non-magnetic material, and the whole is inclosed within the metallic sheath of the cable, preferably at a joint thereof. When desired, these circuit-breakers, which normally are in a position to maintain continuity, can be operated to break the circuit by the application of a magnet to the exterior of the cable. As the cable-sheath and the joint-sleeve in the class of cables to which this invention is applied are invariably made of lead or analogous metal or alloy, there is no difficulty in the successful employment of magnetism for the purpose of acting upon the circuit-breakers, and by the action of a spring or weight they will resume their normal position when the magnet is removed.

In the drawings, which illustrate and form a part of this specification, Figure 1 is a diagram of the circuit-breaker I prefer to employ. Fig. 2 represents a longitudinal section thereof, showing the application of the actuating-magnet. Fig. 3 is a central cross-section of the appliance. Fig. 4 shows a longitudinal section of a cable splice, including a number of jointed conductors. Fig. 5 shows the application of my invention in a working-vault to a system of cables. Fig. 6 illustrates the applicability of my invention to the testing of conductivity as well as insulation. Fig. 7 indicates the introduction into a single circuit of a number of my circuit-breakers, with testing-instruments. Fig. 8 is an alternate form of circuit-breaker, operated, however, by the same principle. Fig. 9 indicates one mode of attaching the actuating-magnet to the cable-splice.

The circuit-breaker $a$, as shown in the drawings, comprises a shell or tube, $b$, of any suitable non-magnetic or diamagnetic material—such as brass or glass—closed at the ends by plugs $c$ $c'$, of some convenient non-conducting material like hard rubber, vulcanized fiber, or hard wood. One of the plugs, $c$, has attached to its inner extremity, by means of a spring, $e$, or a pivot, a rod of iron, $f$. This iron rod is considerably smaller than the surrounding tube and its other end is capable of moving freely in one direction. The plug $c'$, closing the other end of the tube, has on its inner end a projection or shoulder carrying a platinum contact-point, $g$, which coincides and is normally in contact with another platinum contact, $g^2$, on the free end of the rod $f$. This contact is maintained by means of the weight of the rod or by the resiliency of the spring $e$, or both, and when in position the tube will be placed so that the free end of the rod is directly above the fixed contact, so that the influence of its weight will be utilized to its fullest extent. A wire, $d$, connecting with the irod rod, passes out through the plug $c$, and another, $d'$, connecting with the platinum point $g$, passes out in like manner through the plug $c'$.

Fig. 3 shows a cross-section of the appliance through the plate $i$, the function of which is to indicate the side which must be placed uppermost, and also to prevent the appliance from turning. Fig. 4 shows the position of this appliance within the sleeve which covers the ordinary cable-splice within the working-vault. The inclosing-tube is made so small that no extra space other than that already provided in the sleeve is necessary. Fig. 5 is a sectional elevation of the working-vault and a cable-carrying conduit.

C indicates the cables entering the vault from either direction from the conduit-sections B', and $h$ are the splice-sleeves inclosing the conductors $d$ and their individual splices.

In splicing the cable B, when ready to slip the sleeve $h$ over the splices, a measure is applied, and a mark, $z$, made on the exterior of the cable-sheathing beyond the splice at a fixed distance from the center of the inclosing-tube. The sleeve is then slipped into position and soldered to the external cable-sheathing, (which in this class of cables is, as already stated, usually of lead, and which, for the purposes of this invention, must necessarily be of some non-magnetic material,) and a mark made on its upper side just over the center of the tube inclosing the circuit-breaker. The position of this mark is determined by measuring back upon the sleeve from the mark already made upon the cable-sheathing. The circuit-breakers $a$ are inserted within the splice-sleeve, as shown in Fig. 4, on the upper side of the spliced wires, and a required number of the said circuit-breakers are connected in series in a single circuit of the cable. They may be introduced at each vault—say at intervals of five hundred feet. The wire with which they are connected may for convenience, if desired, be covered with a wrapping colored differently from the wrapping of the others; and it may here be observed that it is by no means necessary that this wire shall throughout the cable be upon the outside of the group. It may occupy any position in the cable between the vaults.

Fig. 7 indicates the successive and consecutive arrangement of the circuit-breakers in a circuit and the temporary use of an ordinary telephone-circuit as a cable-testing wire, $a$ being the several circuit-breakers; T, the telephone at the distant station; G, the terminal ground-connections; $l$, the testing-battery; H, the galvanometer, and $k$ the key whereby battery may be put to line.

In lead or woven-fabric covered cables any fault in the lead pipe or fibrous sheathing or any injury occurring thereto will affect the insulation of all the conductors. The insulation of cables of this class to which my testing apparatus is applicable is maintained mainly by the external covering, which excludes moisture from the bundle of wires. The well-known Patterson cable, which is extensively employed for telephonic conductors, is a good example of this. This cable is formed of a bundle of cotton-covered copper wires drawn into a lead pipe, the entire space about the wires being then filled with paraffine. When in perfect order, these cables have an insulation-resistance of from one thousand to two thousand megohms per mile; but if any moisture (no matter how little) enters the pipe through a defect of any kind, the insulation of the entire bundle of wires immediately falls, not necessarily to an equal extent in all of the conductors, but quite considerably in every one, and it is in virtue of this fact that I am enabled to utilize one wire to test the insulation of all; consequently, by locating the defect in insulation on any one of the wires at a certain point in the cable, the fault may readily be reached and repaired.

When it becomes necessary to test the cable for a leak or escape at some point, an ordinary magnet, m, (either an electro-magnet or a permanent magnet may be used,) is placed over the tubular circuit-breaker on the outside of the cable splice at the vault where the test-wire is to be opened. The magnet m is placed, as indicated in Figs. 2, 4, and 5, and attracts the iron rod f within the tube, the magnetic attraction acting through the sleeve and the tube b. The platinum contacts are thus separated, and the test for insulation can then be made from either end of the cable in a manner well understood. When the test is completed, it is only necessary to remove the magnet, and the test-wire closes, the rod resuming its original position by means of its resiliency and weight. The circuit may be successively opened at as many different points at the several vaults as may be found necessary; and if, for example, it be opened first at the third circuit-breaker from the end, and the insulation when measured be found normal, it is evident that the fault is beyond. Continuing the test, we may assume that the fourth circuit-breaker is then operated and the circuit opened there, that the measurement is then repeated, and that it is found that the insulation has fallen materially. This indicates the fault to be between the third and fourth circuit-breakers. I prefer in practice a permanent magnet, as in its use no battery is required. As these tests will be of infrequent occurrence, and as all testing appliances are only designed to save the damage that would result to the cable by cutting it for testing, the necessity of sending a person to the vault to apply the permanent magnet is an inconsiderable disadvantage.

The position of the test-tube within the sleeve is readily known by the mark placed upon the outside of the sleeve, as already described. Even this is, however, not absolutely essential, as the test-tube or circuit-breaker can be found simply by passing the magnet along the sleeve, practice having demonstrated that the motion of the iron rod can be heard through the pipe. If insulation-testing only be desired, the iron rod $f$ is completely insulated from the tube $b$; but if it be desired for any reason to connect one end of the broken circuit to earth, an upper contact, $j'$, (see Fig. 6,) can be placed on the iron rod $f$ and another, $j$, on the upper inner side of the tube. The tube $b$ is then by its upper surface in metallic contact with the interior of the sleeve, and is thereby provided with a ground-connection. By this means the line may be grounded in one direction and opened in the other. In such a case the tubes would be placed all with corresponding ends in the same direction—for example, with the permanent contact end toward the central station. Then for escape the test would be made from the central station, and for a break in the continuity from the opposite or distant end of the cable.

The testing-tubes $b$ are in practice hermetically sealed, as well as being protected by the cable-sleeve; hence no corrosion of parts and no undesired contacts can take place.

I do not restrict myself herein to the exact form of tube or inclosed armature, since it is obvious that the form may be materially modified without departing from the spirit of my invention.

While I regard the form I have described as being ordinarily the best adapted for general purposes, it is obvious that an iron rod free at both ends could be used, or that, as shown in Fig. 8, an iron ball, 15, plated with platinum, may be caused to rest in a brass or other non-magnetic case, 12, (formed in halves, 12 and 13, and secured together at the ends by the sleeve-nuts 14,) upon platinum contacts 17.

In order that the hands of the person in charge of the magnet may be left free for any necessary manipulation, I provide a clamp, R, of any suitable construction, whereby the magnet $m$ may temporarily be affixed to the pipe $h$ by means of screws $s$.

Having now described my invention, I claim—

1. The hereinbefore-described means for breaking the circuit of an inaccessible conductor, which consists of a non-magnetic case or tube inclosing the two ends of said conductor, and a movable iron contact piece normally connecting the said ends of the said conductor, and thereby maintaining continuity between them, but adjusted to respond to magnetic attraction applied at the exterior of said case and thereupon to disconnect the said conductor ends from one another.

2. An insulated cable-conductor protected externally by a non-magnetic sheath or envelope, and having included in its circuit a series of circuit-breakers placed at suitable and known distances apart, and consisting each of an iron armature normally maintaining continuity between the two severed ends of the circuit, and a diamagnetic inclosing-case for the said ends and the interposed armature, the said case being of sufficient internal capacity to admit of the free movement of the armature, and the said armatures being adapted to be operated and to break the circuit only when a magnet is applied to the exterior of the conductor-sheath, substantially as specified.

3. In an electric cable, the combination of a conductor thereof with a circuit-breaking device comprising a non-magnetic tube or case, a fixed contact-piece inclosed therein, but insulated therefrom and in permanent union with the cable-conductor leading from one direction, a movable contact-piece of magnetic metal in permanent union with the said conductor, leading from the opposite direction and normally maintaining the continuity of said conductor by resting under the force of a spring or its equivalent upon the said fixed contact-piece, and a magnet placed on or near the exterior of the said non-magnetic tube or case and acting thereupon to attract the said magnetic movable piece and to withdraw the same from the said fixed contact, thereby opening the circuit, substantially as described.

4. In a multiple-conductor telephone-cable, the combination, substantially as hereinbefore described, with the insulated conductors of the said cable, of a single testing-wire extending through the said cable, and a number of circuit-breakers included in the circuit of the said test-wire at regular and known distances apart, each circuit-closer being located at a cable joint or splice and placed immediately beneath the interior surface of the sleeve overlapping said splice, and each comprising a spring-armature connecting normally the two severed ends of the test-wire, and a non-magnetic case or tube inclosing the same, together with a magnet applied to the exterior of said joint-sleeve, as described, and adapted, when so applied, to act through the said non-magnetic case and joint-sleeve, and thereupon to attract the armature and to break the test-wire circuit at the point of application, and for testing purposes, as long as the said application is continued.

5. The combination, with a multiple-conductor electric cable and with a single-test wire therefor extending from end to end of said cable, of a series of circuit-closers, each located within a sleeve of non-magnetic material protecting the joint or splice of said cable, and each comprising a non-magnetic case, two line-contacts insulated therefrom, an independent contact connecting through said case to earth, and an iron armature normally connecting the said two line-contacts and held in position by spring-pressure, and a magnet to be applied to the exterior of said sleeve, and adapted thereupon to attract the said armature, causing the same to break the line-circuit and to connect one of the severed ends thereof to earth, as herein specified.

6. The combination, with a multiple-conductor electric cable, and with a single test-wire therefor extending from end to end of said cable, of a series of circuit-breakers included in the circuit of said test-wire, each located within a sleeve of non-magnetic material protecting the joint or splice of said cable, and each comprising a non-magnetic case, two line-terminals insulated therefrom, a contact leading through said case to earth, and an iron armature hinged or hung to one of said line-contacts and normally at its free end resting with spring-pressure upon the other, thus maintaining continuity, but adapted to respond to magnetic attraction exercised by a magnet held upon the exterior of the cable, and thereupon to break the normal circuit and to ground one of the severed ends, leaving the other insulated or disconnected.

7. In a multiple-conductor electric cable and in combination therewith, a single test-wire extending from end to end of said cable and having a series of circuit-breakers included in its circuit at suitable distances apart, each circuit-breaker consisting of a diamagnetic case and an armature inclosed therein, normally maintaining continuity between the severed ends of the said test-wire.

8. In a multiple-conductor electric cable and in combination therewith, a single test-wire extending from end to end of said cable and having a series of circuit-breakers included in its circuit at regular and known distances apart, each circuit-breaker consisting of a diamagnetic case and an armature inclosed therein, and by spring-pressure or equivalent force normally maintaining continuity between the severed ends of the said test-wire, and a magnet externally applied to operate the said circuit-closer when desired by the attraction of the magnet.

9. The combination, with a multiple-conductor cable having splices or joints located within test-vaults or working-chambers and provided with non-magnetic splice-protecting sleeves, and having a test-wire extended throughout the cable, provided with a series of circuit-breakers, each circuit-breaker being placed at the outside of the grouped conductors and within a splice-sleeve close to the interior surface thereof, and each comprising the two severed ends of the test-wire inclosed within a non-magnetic shell, and an armature also inclosed within said shell and normally maintaining continuity between the said severed ends, of a magnet for actuating the said iron armature through the non-magnetic shell and the cable-sleeve, the same being externally applied to the said sleeve, and a clamping device whereby the said magnet may be temporarily attached to the said sleeve, as described.

10. The combination, in a telephone-cable, of magnetic circuit-breakers distributed at intervals throughout the length of the cable and included in the circuit of but one of the insulated conductors, the said circuit-breakers being located at the splices of said cable and immediately beneath the inner surface of the protecting non-magnetic sleeve thereof, and a magnet applied externally to said sleeve for the purpose of actuating the said magnetic circuit-breakers, whereby a single testing-wire may be utilized to test an entire cable, substantially as described.

11. The combination, in a telephone-cable, of a single test-wire extending from end to end of said cable and a series of normally-closed circuit-breakers included in the circuit thereof, as described, at regular distances apart and within the splices or joint sleeves close to the internal surface of the said sleeves, each circuit-breaker being inclosed within a non-magnetic shell and comprising an electric contact controlled by an armature, whereby the said test-wire may be opened at successive points by the application of a magnet to the exterior of the cable sleeve, and whereby a single wire may thus be utilized to test the insulation of the entire cable.

12. The hereinbefore-described device for opening the circuit of lead-inclosed cable-conductors at predetermined points, which comprises a spring-armature connecting the two ends of the said cable-conductor within a non-magnetic shell and a magnet to disconnect the said armature from the said cable ends, the armature and its inclosing-shell being located on the inside of the external leaden inclosing-sheath, and the magnet being applied to the exterior thereof.

13. In combination with the testing-wire of a lead-covered multiple-conductor cable, a series of circuit-breakers adapted to be operated by the application of a magnet to the exterior of the leaden sheath, each being constructed of a brass tube having both ends closed by a hard-rubber plug, insulated conductors passing through the said plugs and connecting with the testing-wire, a fixed contact-piece mounted in the brass tube upon one of the said plugs and connected with one of the said conductors, and an iron armature mounted by a spring upon the other plug connected with the other conductor and held by the said spring in normal contact with the fixed contact-piece, as specified.

In testimony whereof I have signed my name to this specification, in the presence of two subscribing witnesses, this 21st day of November, 1887.

ISAIAH HENRY FARNHAM.

Witnesses:
FRED J. F. SCHWARTZ,
GEO. WILLIS PIERCE.